June 13, 1961  J. J. ARPS  2,987,822
DEPTH MEASUREMENT
Original Filed Feb. 1, 1952  5 Sheets-Sheet 1
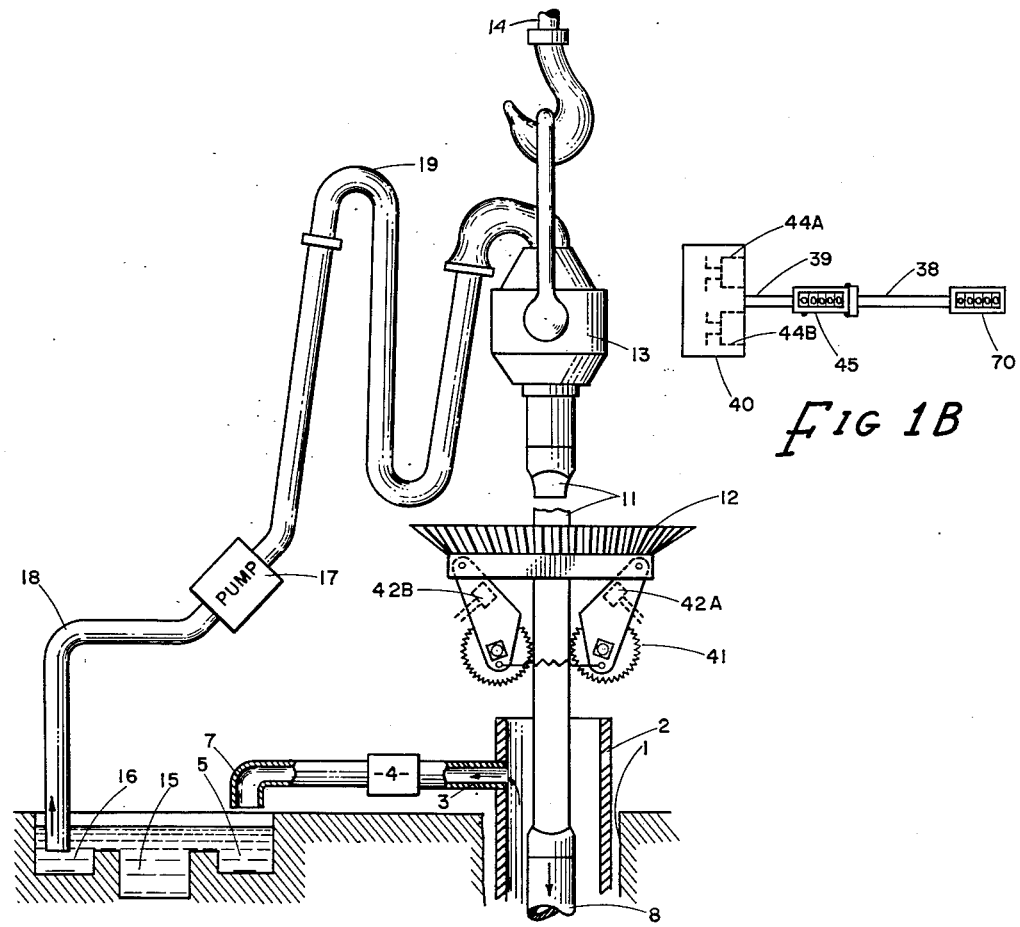
FIG 1
FIG 1B
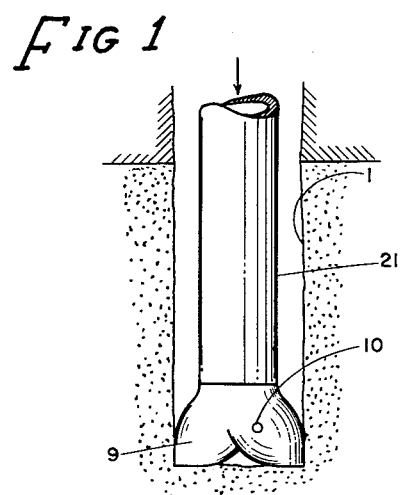
FIG 1A
INVENTOR.
Jan Jacob Arps June 13, 1961  J. J. ARPS  2,987,822
DEPTH MEASUREMENT
Original Filed Feb. 1, 1952  5 Sheets-Sheet 2
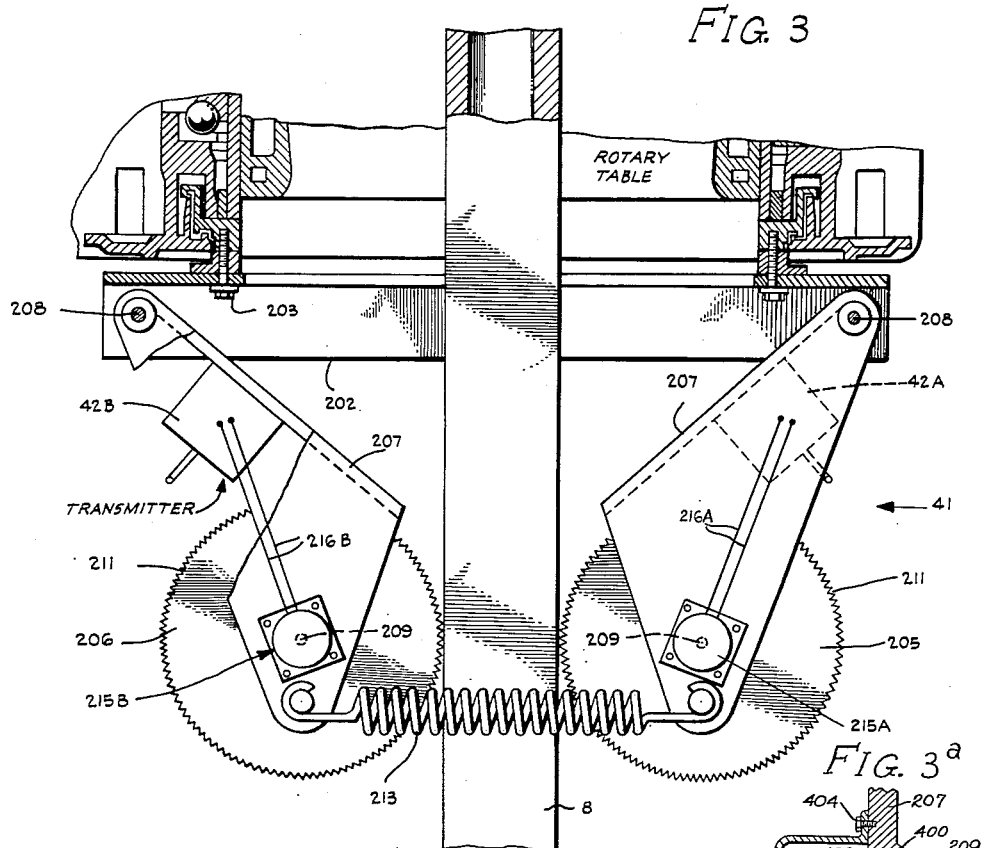
FIG. 3
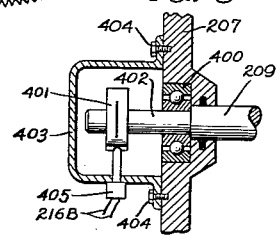
FIG. 3ª
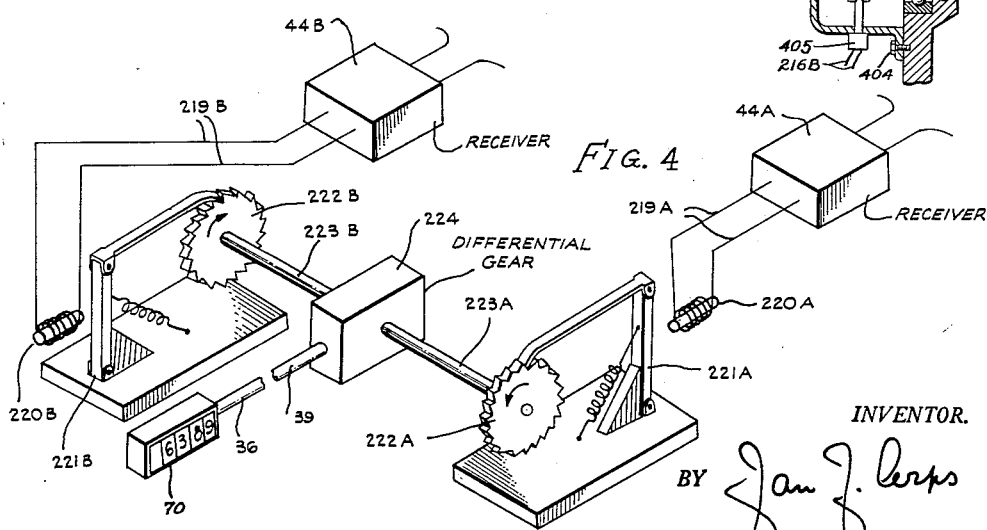
FIG. 4
INVENTOR.
BY Jan J. Arps

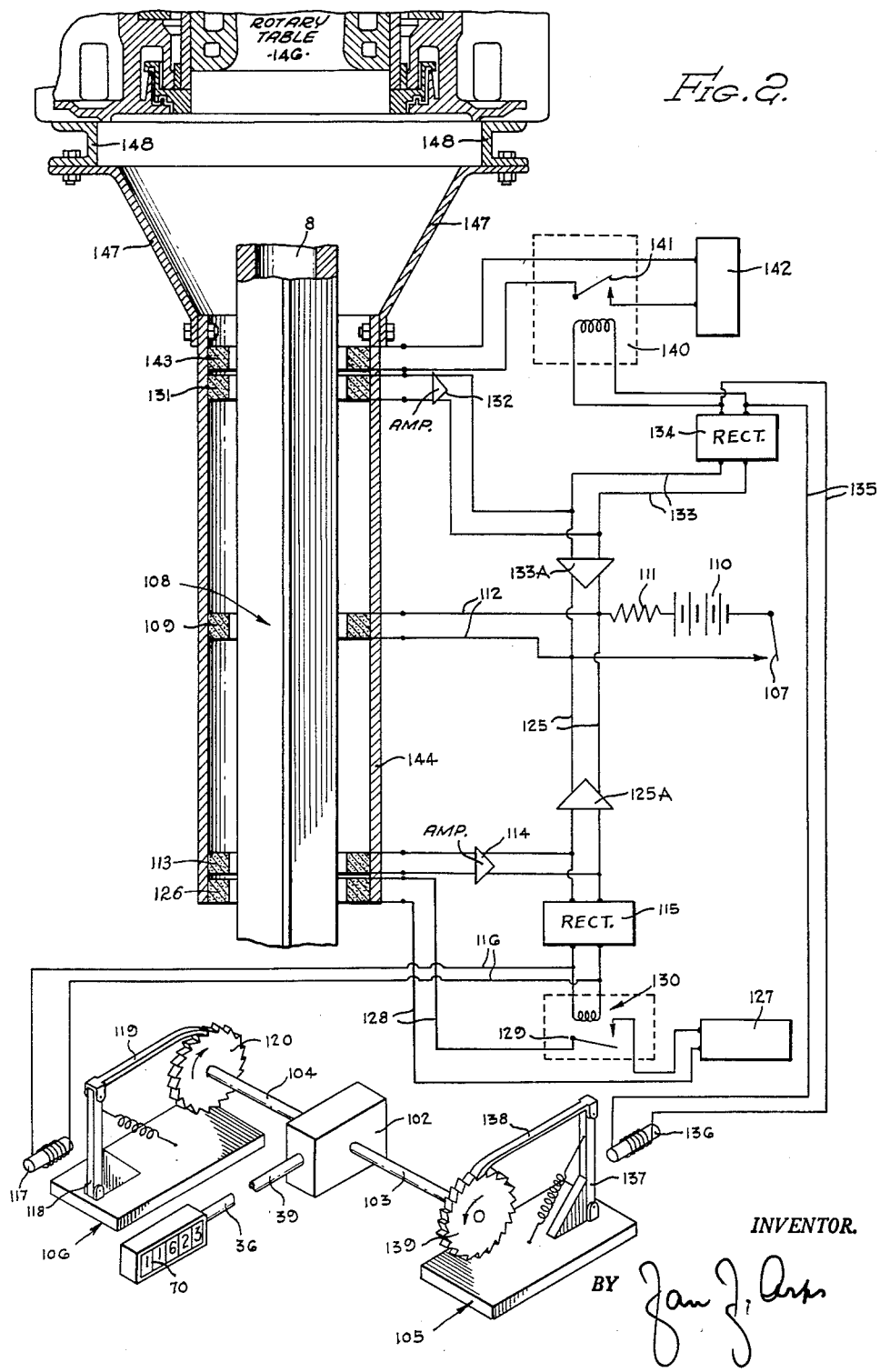

June 13, 1961  J. J. ARPS  2,987,822
DEPTH MEASUREMENT
Original Filed Feb. 1, 1952  5 Sheets-Sheet 4
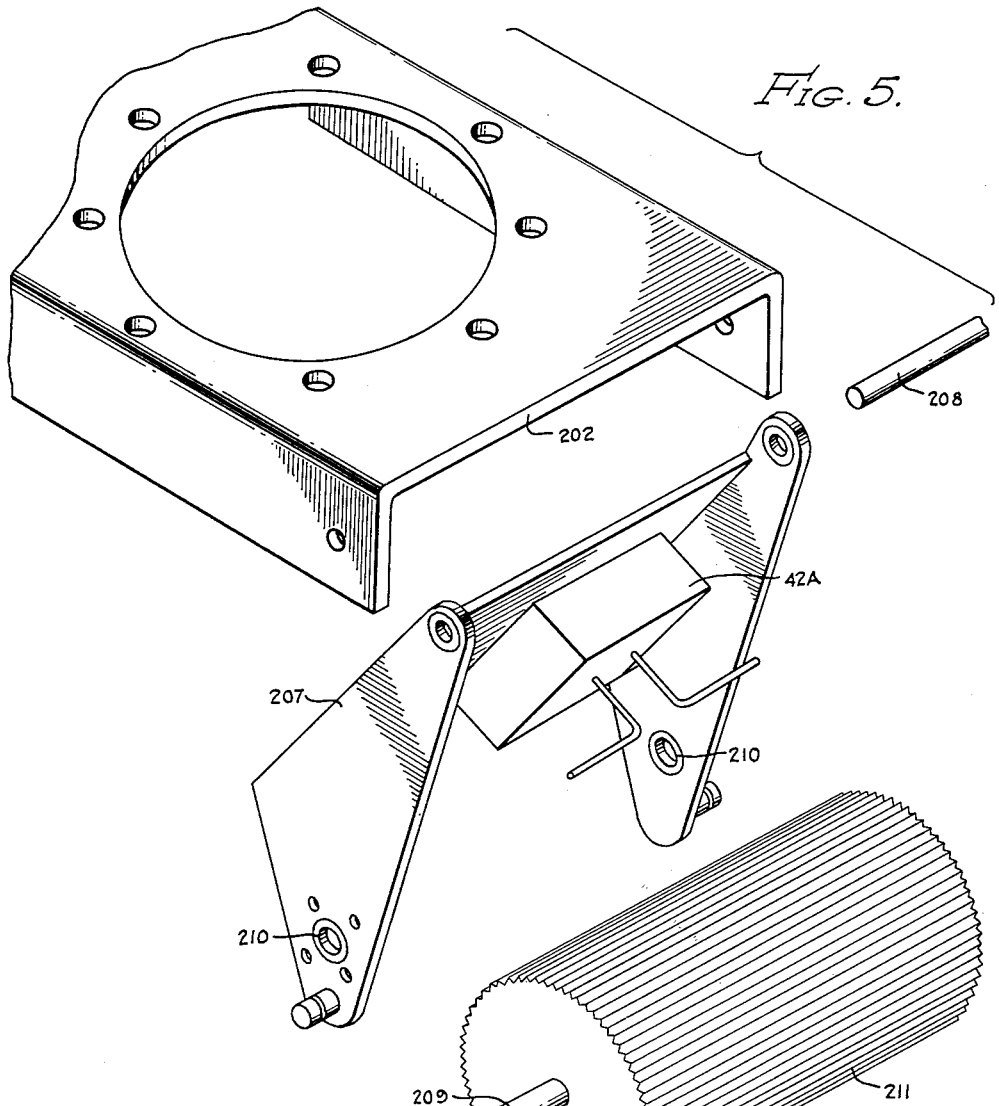
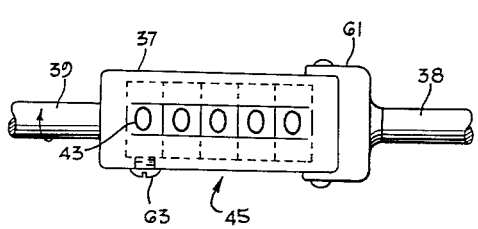
INVENTOR.
BY Jan J. Arps June 13, 1961 J. J. ARPS 2,987,822
DEPTH MEASUREMENT
Original Filed Feb. 1, 1952 5 Sheets-Sheet 5
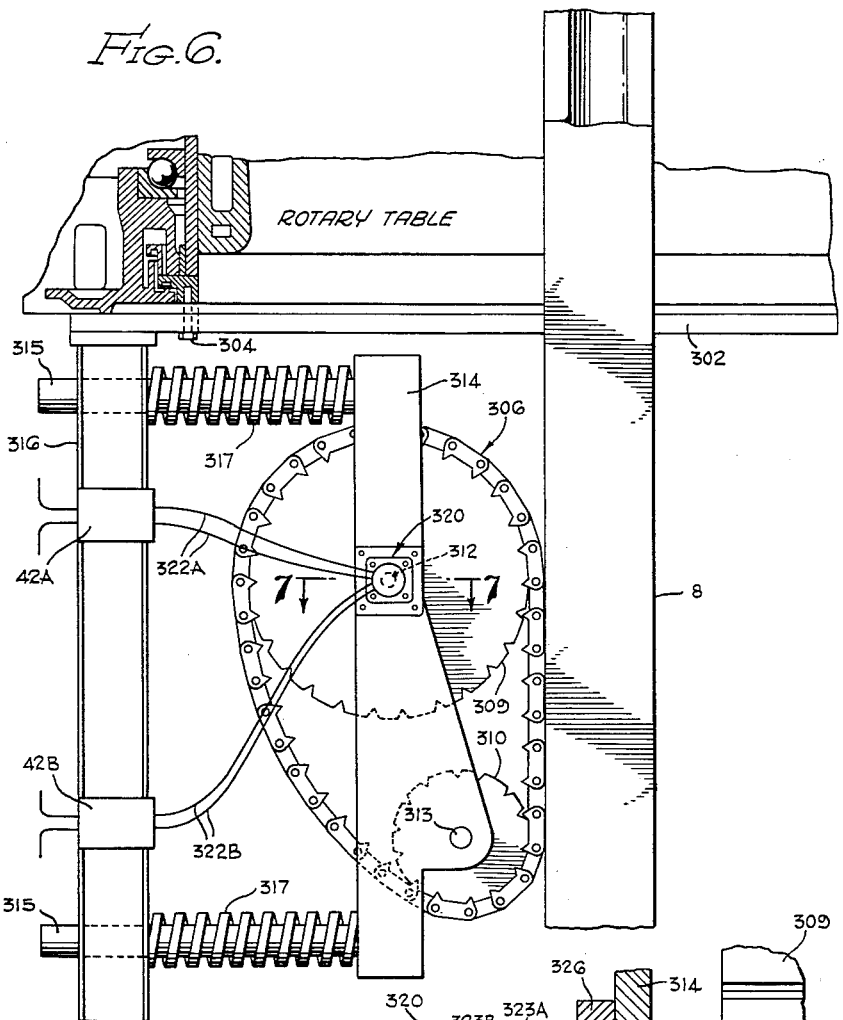
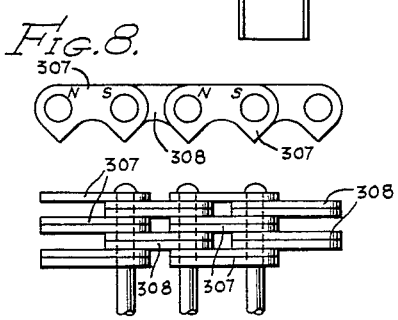
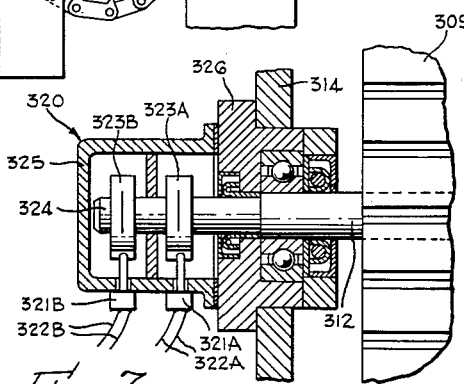
INVENTOR.
BY Jan J. Arps

United States Patent Office 2,987,822
Patented June 13, 1961

2,987,822
DEPTH MEASUREMENT
Jan J. Arps, 414 Peavy Road, Dallas 18, Tex.
Original application Feb. 1, 1952, Ser. No. 269,568, now Patent No. 2,806,372, dated Sept. 17, 1957. Divided and this application Dec. 26, 1956, Ser. No. 630,714
9 Claims. (Cl. 33—134)

The present invention relates to a method and apparatus for indicating the depth of a borehole. This application is a division of U.S. Patent No. 2,806,372, the application for which was filed February 1, 1952.

It is an object of the present invention to provide a new and improved apparatus for continuously measuring the increasing depth of a borehole during drilling.

Another object of the present invention is the provision of new and improved apparatus for measuring the depth of a borehole or the exact length of pipe in boreholes, which is constructed especially to provide such indication both during the normal drilling operation when the drill is rotating and when the drill string is being raised and lowered and not rotating.

Other objects, advantages, and features of novelty of the present invention will become apparent from the ensuing description of illustrative embodiments thereof in the course of which reference is had to the accompanying drawings, in which:

FIGURES 1, 1A and 1B are schematic representations of apparatus constructed in accordance with and utilizing the methods of the present invention;

FIGURE 2 is a schematic representation of one embodiment of depth measuring apparatus constructed in accordance with the present invention and which may be used in conjunction with the apparatus of FIGURE 1;

FIGURES 3, 3a and 4 are diagrammatic illustrations of another embodiment of depth measuring apparatus of the present invention and which may be used in conjunction with the apparatus of FIGURE 1;

FIGURE 5 is an exploded, fragmentary view of a part of the apparatus illustrated in FIGURE 3;

FIGURE 6 is a fragmentary elevational view, partly in section, of another modification of the depth measuring apparatus which may be used in conjunction with the apparatus of FIGURE 1;

FIGURE 7 is a fragmentary cross-sectional view taken along line 7—7 of FIGURE 6;

FIGURE 8 is a fragmentary side elevational view of a portion of the magnetic chain illustrated in FIGURE 6;

FIGURE 9 is a plan view of the apparatus shown in FIGURE 8; and

FIGURE 10 is a diagrammatic detail view of a maximum depth counter device as shown in FIGURE 1.

Referring now to the drawings and first to FIGURES 1, 1A and 1B, it may be seen that these figures are schematic views including a vertical section through a well being drilled in accordance with the method and apparatus of the invention.

The apparatus illustrated in FIGURES 1, 1A and 1B for drilling a well or borehole may be constructed and operated for the most part in accordance with modern conventional rotary drilling practice and has been illustrated only in part. It does, however, employ a circulating drilling fluid such as a suspension of clay solids in water and conventionally termed "rotary mud," or simply "mud," which is forced down the drill stem and out through the drill bit into the bore hole, to carry the drill cuttings up and out of the bore hole as drilling proceeds. The upper portion of the hole is lined with a surface casing 2 which usually extends but a comparatively short distance into the drilling well. At its upper end the casing 2 is provided with a side outlet pipe 3 for discharging the returning stream of circulating drilling mud from the borehole. The pipe 3 leads into a shale shaker 4 having the function of separating out the formation cuttings carried upward by the drilling mud. The mud passes from the shale shaker 4 through a discharge nozzle 7 into a conventional mud ditch 5.

Extending into the well through the casing 2 and borehole 1 is a conventional hollow drill string usually composed of drill pipe of ferro-magnetic material such as steel, designated generally by the numeral 8 in the drawings, which is connected at its lower end to a drill bit 9 having fluid discharge openings 10 adjacent the cutting teeth or cutting edge of the bit. A kelly joint 11 is connected to the upper end of the drill string and extends through a rotary table 12 mounted conventionally on the floor of a derrick and which is rotated by apparatus (not shown) in order to effect rotation of the drill bit. The upper end of the kelly joint is connected to the usual rotary hose swivel 13, and the entire drill string is suspended from a traveling block 14 which is adapted to be raised and lowered in the derrick in accordance with conventional practice by well known means.

The apparatus for circulating the drilling fluid through the borehole comprises the mud ditch 5 previously referred to a, settling pit 15, suction pit 16, and a mud circulation pump 17 having a suction pipe 18 leading to the suction pit and a mud discharge pipe 19 in communication with the drill pipe 8, through the swivel 13.

The lower portion of the drill string may be constructed as disclosed in my previous Patents No. 2,658,725 and No. 2,659,046, and includes a drill collar 21.

Receiving apparatus 40 (FIG. 1B), which may take any one of the several forms best shown in connection with FIGURES 2 and 4, as will be described hereinafter in greater detail, is supplied with drill string depth indicating impulse signals from transmitting apparatus, indicated generally at 41, secured to and rotating with the rotary table 12. These signals are utilized to operate, through shaft 39 a maximum depth counter device 45 and through shaft 38, a maximum depth indicator 70, as will be described hereinafter. The transmitting apparatus 41 may take any one of the several forms best shown in FIGURES 2, 3, and 6, the form shown in FIGURE 3 being illustrated by way of example in connection with FIGURE 1, and in the case of FIGURE 3 includes transmitters 42A and 42B adapted to transmit signal impulses on different frequencies. The receiving apparatus associated therewith includes receivers 44A and 44B each adapted to selectively receive the signals of one of the transmitters 42A or 42B, and these receivers are adapted to control suitable apparatus for rotation of shaft 39 such that the latter is rotated through an equal angle in one direction or the other in response to each signal received by a receiver, the direction of such rotation being dependent upon which of the receivers receives the signal from its associated transmitter, and the extent of such rotation of shaft 39 in each direction being dependent upon the number of such signals. The transmitters 42A and 42B are selectively energized to transmit selectively different signals in response to up or down movement of the drill string and at intervals corresponding to equal lengths of movement of the drill string. The detailed construction and operation of the transmitting and receiving apparatus, which also constitute a continuously operating depth indicating means, will be described in greater detail hereinafter in connection with FIGURES 2 et seq.

The maximum depth counter device 45 is a device capable of transmitting rotation from the input shaft 39 to the output shaft 38 in one rotational direction only, which for convenience of description may be considered herein as the forward direction, and the mechanism of this device is such that, in the event the input shaft 39 turns in the reverse direction any number of turns, it will not resume the transmission of forward rotation to shaft 38 until the input shaft 39 has again rotated forwardly a number of times equal to the previous number of reverse turns. An example of a device suitable for this purpose is illustrated in FIGURE 10, wherein a counter device 37, which may be a Veeder reversible revolution counter of well known type, is employed. The input shaft 39 of the counter is coupled to the before-mentioned receiving apparatus 40 of the depth measuring apparatus, and the opposite end of the body of the counter device 37 opposite to the shaft 39 is coupled at 61 to the output shaft 38. The end counter wheel 43, which normally indicates the highest multiples on the counter scale, is locked against rotation with respect to the counter body 37 by suitable means, such as by a setscrew 63, such that, when the shaft 39 is rotated in a clockwise direction or forward direction, as hereinbefore defined, the counter scale will attempt to shift back from 00000 to 99999, but, since the last or highest digit wheel is locked, as before mentioned, clockwise rotation of the shaft 39 relative to the counter body in this direction is thereby prevented. Under this condition, the clockwise rotation of shaft 39 is transmitted through the counter body 37 to the output shaft 38. When the shaft 39 is rotated in a counterclockwise or reverse direction, the shaft 39 is free to rotate relative to the counter body 37 and to actuate the counter in the normal manner, under which condition the counter body 37 remains stationary and no counterclockwise rotation will be imparted through it to shaft 38. It is apparent, therefore, that, without imparting rotation to shaft 38, shaft 39 can rotate any number of turns counterclockwise up to the highest number which can be counted on the particular counter employed, with the highest digit wheel locked, as hereinbefore described, for example, up to 9999 on the five-place scale herein illustrated. After having thus rotated counterclockwise or in reverse a certain number of revolutions, the shaft can then be rotated the same number of revolutions in a clockwise or forward direction before the rotational limit of shaft 39 relative to the counter body is again reached and coupling again established through from shaft 39 to shaft 38.

A counter of any desired capacity or a number of counters coupled in end-to-end series may be employed, as required, to provide a sufficient number of turns for the full borehole depth measuring range of the apparatus.

The maximum depth reached by the drill string or the total depth of the borehole can be continuously and visually indicated, as by a suitable counter 70 driven by a suitable extension 36 of the shaft 38 of the maximum depth counter apparatus hereinbefore described.

Various depth measuring apparatus which can be utilized with the system of FIGURE 1 are illustrated in FIGURES 2 to 8, and they will be described hereinafter, beginning first with the embodiment illustrated in FIGURE 2. This depth measuring apparatus includes signal producing means cooperatively associated with a drill string for producing signals in response to vertical movements of the drill string, and means for receiving such signals and controlled by such signals for producing and transmitting other signals for indicating the depth of the drill string. The other signals are produced whenever the drill string moves a predetermined distance up or down and are used differentially or algebraically to operate a depth counter 70 to provide either a continuous indication of the actual depth of the drill string at any given time or to provide an indication of the total depth of the borehole. The counter 70 is operated through a shaft 39 from differential gearing 102 connected by shafts 103 and 104 to electromagnetic operating devices 105 and 106, respectively, which are selectively and intermittently operated, one in response to the upward movements and the other to downward movements of the drill string.

The apparatus is adapted to be placed in operation upon the establishment of a mark on the drill string. This mark may be and is illustrated as being a magnetic mark and one that is produced upon the closure of a manually operable switch 107. When the switch is closed, a magnetic mark is produced by longitudinal magnetization in the region 108 of the drill string by the passage of current through a magnetic marking coil 109 which is connected upon closure of the switch to a battery 110 through a resistor 111 and conductors 112.

The movement of the drill string carrying the magnetic mark thereon a predetermined distance up or down from the location of coil 109 is utilized to produce a control signal, as hereinafter described. When the drill string moves downwardly, the mark moves into the region of a downward pick-up coil 113, and a signal is thus inductively produced in this coil. This signal from coil 113 is simplified by the amplifier 114 and supplied to the input of a rectifier 115. The rectified signal from rectifier 115 applies an operating signal voltage from its output through conductors 116 to electromagnet 117 of the counter operating means 106. The electromagnet attracts armature 118 to move the pawl 119 which is in engagement with the ratchet teeth of the ratchet wheel 120 to rotate the latter through a unit angular distance, which may correspond to the angle subtended by one ratchet tooth, each time the drill string moves downwardly a predetermined distance.

The amplified signal voltage supplied by the amplifier 114 is utilized to produce, at the same time, another magnetic mark on the drill string, and this is done by connecting the output of amplifier 114 to an isolating amplifier 125A, and thence through conductors 125 and the previously referred-to conductors 112 to coil 109. The detected magnetic mark, after passing through coil 113, is erased from the drill string by a downward demagnetizing coil 126 which is connected through the conductors 128 to a source of alternating current, such as a high frequency oscillator 127, upon closure of switch 129 of a time delay relay 130. The time delay relay 130 is connected to and controlled by the output of rectifier 115.

The indication of upward movement of the drill string is provided by similar apparatus operative in the same manner as before described in connection with the apparatus for indication of downward movement. This includes an upward pick-up coil 131 connected through amplifier 132 and conductors 133 to the rectifier 134 and also through the conductors 133, isolating amplifier 133A, and conductors 112 to the magnetic marking coil 109. The output of rectifier 134 is connected by conductors 135 to operating electromagnet 136 of the counter operating device 105, the armature 137 of which is operatively connected to pawl 138, which is in engagement with the ratchet teeth of the ratchet wheel 139. The output of rectifier 134 is also connected to the time delay relay 140, the switch 141 of which is adapted to connect an oscillator 142 to the upward demagnetizing coil 143.

The marking, detecting, and demagnetizing coils may be supported in concentric relation to the drill string 8 by any suitable structure, such as by the non-magnetic tubular member 144 which may be connected to the under side of the non-rotating portion of the rotary drill table 146 by braces 147 and supporting beams 148. The tubular member 144 may be made of copper or other suitable metal or material.

In operation of the depth measuring apparatus of FIGURE 2 in connection with the logging apparatus of FIGURE 1, hereinbefore described, the switch 107 is first closed briefly to energize coil 109, thereby magnetically to mark the drill string initially at 108 at a known or measured distance from the drill bit 9. When the drill string moves a distance equal to that between the coil 109 and either coil 113 or 131, the magnetic mark 108 is moved therewith into either coil 113 or 131, resulting in a control signal being supplied to the associated amplifier 114 or 132, as the case may be. The amplified signal is supplied from either amplifier to coil 109 to place a new mark on the drill string and also at the same time to one of the rectifiers 115 or 134. For example, if by downward movement of the drill string the magnetic mark is carried down into coil 113, the amplifier 114 supplies a voltage pulse to electromagnet 117 to operate the counter actuating unit 106 to cause counter 70 to add one unit of indicated depth or distance equal to the distance between coil 109 and coil 113, and also to operate, with a suitable time delay, the relay 130 whereby the oscillator 127 is connected to the demagnetizing coil 126 to erase the detected magnetic mark.

When the drill string moves upwardly, carrying the magnetic mark 108 upward into coil 131, the resultant amplified signal from amplifier 132 is supplied to coil 109 and to rectifier 134. The resultant voltage pulse from the output of the rectifier 134 is supplied to electromagnet 136 of the counter actuating unit 105, and the counter is thereby caused to move one unit of the indicated depth or distance in an upward direction equal to the distance between coil 109 and coil 131. The pulse from the rectifier 134 also actuates relay 140, which operates with a suitable time delay to connect the oscillator 142 to the upward demagnetizing coil 143 to erase the detected magnetic mark.

The counter shaft 39 and counter 70, if connected directly thereto, are thus selectively operated, in one direction or the other, intermittently in response to corresponding direction and distance of movement of the drill string.

A modified form of depth measuring apparatus is illustrated in FIGURES 3 to 5, inclusive. In brief, this apparatus, as herein illustrated, includes a pair of pivotally supported rollers 205 and 206 resiliently biased into engagement with opposite sides of the drill string 8, a pair of signal generating means 42A and 42B which are selectively rendered intermittently operative in response to longitudinal movement of the drill string 8 in opposite directions, receiving apparatus including receivers 44A and 44B selectively and periodically operated by the signal generating means, and means for algebraically counting the said operations thereby to measure the drill string movement into and out of the borehole.

The transmitting apparatus is suspended from the rotatable portion of the rotary table 12 for rotation therewith, by means of an adapter bracket 202 secured to the under side of the table in suitable manner, as by cap screws 203. The drill string engaging rollers 205 and 206 are movably supported underneath the rotary table by means of lever arms 207 which are pivotally mounted at their upper ends upon shafts 208. The rollers 205 and 206 are mounted on shafts 209 which are rotatably journaled in bearings 210 carried adjacent the lower ends of the lever arms 207, as best shown in FIGURE 5. The rollers 205 and 206 are provided, on the exterior cylindrical surface thereof, with longitudinally extending teeth 211 to make non-slipping engagement with the conventional steel drill pipe of the drill string 8. The rollers 205 and 206 are pivotally biased to move laterally toward each other and into rolling engagement with the drill pipe extending therebetween by means of springs 213, with sufficient force to provide the required friction for proper rotation of the rollers in opposite directions as the drill string is raised or lowered. The rollers 205 and 206 are also of sufficient width so as to engage the drill string even when the latter is displaced from the center of the rotary table lengthwise of the rollers. Lateral displacement of the drill string radially of the rollers is permitted by the before-described hinged mounting of the rollers.

The signal generating means controlled in response to vertical movement of the drill string include the transmitters 42A and 42B which are mounted on the lever arms 207. These transmitters are selectively rendered operative in response to longitudinal movement of the drill string in opposite directions into or out of the borehole, by signal producing means 215A and 215B. A typical construction of signal-producing means 215A and 215B is shown in cross-section in FIGURE 3a. Shaft 209, which supports roller 206, is supported by a ball bearing 400. A conventional one-way clutch 401 is mounted on the extension 402 of shaft 209 and protected by a cup-like housing 403 fastened to lever arm 207 with bolts 404. A control switch 405 is attached to housing 403 and is arranged to be intermittently momentarily closed in response to a predetermined unitary distance of vertical movement of the drill string 8. The one-way clutch 401, which is mounted in signal-producing means 215B, is designed so that it follows the rotation of shaft 209 only when the drill string is moving in a downward direction, and the closing of the control switch 405 will therefore only be in response to such downward increments. In a similar manner the one-way clutch in signal-producing means 215A only responds to upward movements of the drill string, and the corresponding control switch will therefore be activated only when certain predetermined incremental upward movements of the drill string are recorded. In operation the control switch of unit 215A is therefore intermittently operated when the drill string moves upwardly, the switch being closed and opened a number of times proportional to the length of longitudinal movement of the drill string 8 upwardly through the rollers 205 and 206, and a switch of 215B is similarly operated when the drill string moves downwardly. The signal producing means 215A is coupled by conductors 216A to the transmitter 42A, and the latter is thereby intermittently operated to transmit signals intermittently, the number of which is correspondingly proportional to the length of longitudinal movement of the drill string upwardly out of the borehole. The signal producing means 215B is similarly coupled by conductors 216B to the transmitter 42B and controls its operation in like manner. The transmitters 42A and 42B are arranged to produce signals which are distinctive from one another, for example, electromagnetic or radio signals of different frequencies.

The signals transmitted by the transmitters 42A and 42B are received by the receivers 44A and 44B, which may be located at a desired remote point and which, when the signals are distinctive by reason of having different frequencies, are tuned to receive signals of the frequency of the transmitters 42A and 42B, respectively. Whenever a receiver receives such a signal, it supplies an electrical impulse to actuating means connected through a suitable differential device to an indicator, such as the counter 70, to provide an accurate indication of the travel of the drill string in opposite directions and continuously to indicate the length of pipe within the borehole. The transmitters 42A and 42B and receivers 44A and 44B may comprise electrical apparatus for the transmission and reception of radio waves, more or less conventional in the radio engineering art.

The current pulses from the receivers 44A and 44B pass through conductors 219A and 219B to their respective operating electromagnets 220A and 220B. When an electromagnet is thus energized, it attracts its associated armature 221A or 221B to effect rotation of its corresponding ratchet wheel 222A or 222B through a suitable angle, such as, for example, that corresponding to one ratchet tooth. The ratchet wheels 222A and 222B are connected by the shafts 223A and 223B to a differential gear arrangement 224, the output shaft 39 of which may be operatively connected to the logging apparatus shown and hereinbefore described in connection with FIGURE 1 which includes the counter 70.

The rotation of the output shaft 39 is thus responsive to the algebraic sum total of all the up and down movements of the drill string between the rollers 205 and 206, and the reading of counter 70 if connected directly to shaft 39 thus provides an indication of the amount of drill pipe which is extended through the rotary table and past the measuring rollers 205 and 206 into the borehole. The counter 70, if connected to shaft 39 as shown in FIGURE 1, provides an indication of the maximum depth reached by the drill string. It is obvious that this measuring system is unaffected by rotation of the rotary table 12 during drilling, since the pipe and measuring rollers rotate together with the rotary table.

Another embodiment of the depth measuring apparatus is illustrated in FIGURES 6 to 9, inclusive, to which reference will now be had. In brief, the apparatus illustrated in these figures includes a broad endless belt-like element having spaced magnetic portions magnetically engageable with and adapted to be driven in one direction or the other by the longitudinal movement of the drill string upward or downward in the borehole, a pair of signal generating means, and means for selectively and periodically rendering the signal generating means operative in response to such upward and downward movements of the drill string.

The apparatus of this embodiment of the depth measuring apparatus is adapted to be suspended underneath and to rotate with the rotating portion of the rotary table 12 by an adapter bracket 302 secured to the under side of the rotary table in suitable manner, as by the cap screws 304.

The endless belt-like element, having spaced magnetic portions and which is engageable with and driven by the drill string 8, is indicated generally at 306. As illustrated in FIGURES 8 and 9, this belt-like element is in the form of a broad magnetic chain composed of a series of permanently magnetized links 307 separated from one another by links 308 of non-magnetic material, such as brass. The magnetic chain 306 is movably mounted upon a broad measuring sprocket 309 and a broad idler sprocket 310 which are carried on shafts 312 and 313, which are in turn rotatably mounted in anti-friction bearings on spaced-apart support brackets 314.

The magnetic chain 306 is resiliently held against the drill string so that the portion thereof in magnetically induced gripping engagement with the drill string will partake of the vertical movement of the drill string in opposite directions when the drill string is moved vertically up or down through the rotary table and irrespective of whether the rotary table is rotating or not. This is accomplished by supporting the chain for rotary movement together with the rotary table. To accomplish this, the two chain supporting brackets 314 are mounted upon a plurality of horizontal guide rods 315, preferably four in number, of which but two are visible in the view of FIGURE 6. The guide rods 315 are supported for horizontal sliding motion in suitable guides carried in a pair of vertical main supporting elements 316, of which but one may be seen in FIGURE 6, said main supporting elements being attached at their upper ends to the adapter bracket 302. The chain is yieldably held against the drill string by helical springs 317 surrounding the guide rods 315 and acting in compression between the supporting brackets 314 and the main supporting elements 316.

Attached to the main supporting elements 316 are a pair of signal transmitters 42A and 42B, the same as or similar to transmitters 42A and 42B hereinbefore described in connection with FIGURE 3, and adapted to be controlled in response to vertical movement of the drill string into and out of the borehole.

The transmitters 42A and 42B are selectively and intermittently rendered operative in response to movement of the drill string in opposite directions into or out of the borehole by control-signal producing means indicated generally at 320. This control-signal producing means includes a pair of oppositely acting control switches 321A and 321B coupled by the conductors 322A and 322B to the transmitters 42A and 42B, respectively. The switches 321A and 321B may be of a suitable sensitive type similar in construction to those shown at 405 in FIGURE 3a and arranged to be intermittently momentarily closed in response to predetermined unitary distances of movement of the drill string in one direction or the other into or out of the borehole. The switch 321A may be arranged to be actuated only when the drill string moves downwardly, while the switch 321B may be arranged to be actuated only when the drill string moves upwardly. Such operation of the switches can be readily effected by employing a one-way overriding clutch between each of the cams 323A and 323B and the shaft extension 324 of measuring sprocket shaft 312, said overriding clutches being oppositely acting relative to the direction of rotation of shaft 324. A cup-like housing 325, suitably secured to the exterior of the anti-friction bearing support 326, serves as a protective enclosure for the switching mechanism, as shown in FIGURE 7.

In operation, the magnetic chain 306 is attracted magnetically into engagement with the steel pipe of the drill string 8, and, inasmuch as it rotates with the rotary table and drill string, there will be no relative rotary motion between the drill stem and the chain. The chain, however, will move in one direction or the other about the sprockets 309 and 310 with vertical movements of the drill string. When the drill string moves downwardly, the one-way clutch in cam 323A will cause the cam to rotate with shaft 324, 312, while cam 323B remains stationary, thereby causing the switch 321A to be actuated, and the number of times of such actuation will be proportional to the distance of such downward movement of the drill string. The transmitter 42A, connected through conductors 322A to the switch 321A, will thus be rendered operative to transmit corresponding intermittent signal impulses to the receiver associated with it which may be one such as the receiver 44A of the previously described apparatus of FIGURES 3 and 4.

When the drill string moves upwardly, the one-way acting clutch in cam 323B will cause it to rotate with shaft 324, 312, while cam 323A remains stationary, thereby causing switch 321B to be actuated a number of times proportional to the distance of such movement of the drill string. The transmitter 42B, connected through conductors 322B to the switch 321B, will thus be rendered operative to transmit corresponding intermittent signal impulses to the receiver associated with it, which may be one such as the receiver 44B of the previously described apparatus of FIGURES 3 and 4. The signals transmitted by transmitters 42A and 42B are, as before mentioned, received by receivers corresponding to receivers 44A and 44B of the previously described embodiment of FIGURES 1, 3, and 4 and operate indicating and/or recording mechanism like that heretofore described.

It is to be understood that the foregoing is illustrative only, and that the invention is not to be limited thereby, but includes all modifications thereof within the scope of the invention as defined in the appended claims.

What is claimed is:

1. Apparatus for attachment to the rotary table of drilling equipment for measuring the length of the elongated tubular pipe below the table including a pair of rollers, means pivotally supporting said rollers, resilient means biasing said rollers toward said pipe whereby said rollers are rotated in opposite directions in response to vertical movements of said pipe, a pair of signal generating means, and means including oppositely arranged one-way clutches operatively connected to said rollers and signal generating means, control switches operated through said clutches for periodically and selectively rendering said signal generating means operative.

2. In a drilling equipment, including a rotary table, a drill string depth measuring system including a pair of movable signal transmitters for producing signals, the motion of said transmitters being related to the rotary movement of said table, means including drill string movement responsive means and control signal producing means controlled thereby for selectively and periodically producing control signals in response to the direction and extent of drill string movement, transmitter control means coupled to said control signal producing means for rendering said transmitters operative to transmit signals, a pair of stationary receiving devices supplied with and operated in response to said signals, operable means coupled to each receiver adapted to be operated each time its associated receiving device is rendered operative, and means for algebraically adding the operations of said last mentioned means.

3. In a drilling equipment, including a rotary table, a depth measuring apparatus including a movable signal producing means comprising an element adapted to engage and be driven by an elongated tubular pipe used in drilling for producing a control signal in response to vertical movement of said pipe, the motion of said signal producing means being related to the rotary movement of said table, and a stationary depth measuring means supplied with said signal for indicating the depth of said pipe.

4. In a drilling equipment, including a rotary table, an apparatus for attachment to the rotary table for measuring the length of the elongated tubular pipe below the table including movable pipe engaging means, means movably supporting said means, resilient means biasing said pipe engaging means toward the drill string whereby said pipe engaging means is moved in opposite directions in response to vertical movement of the pipe, a pair of movable radio transmitters transmitting distinctive radio signals, the motion of said transmitters being related to the rotary movement of said table, and means including oppositely arranged one-way clutches operatively connected to said pipe engaging means and transmitter operations controlling switches operated through said clutches for periodically and selectively rendering said radio transmitters operative, and a stationary measuring means supplied with said signals for indicating the length of the pipe below said table.

5. In a drilling equipment, including a rotary table, an apparatus for attachment to the rotary table for measuring the length of an elongated tubular pipe below the table including movable pipe engaging means, means movably supporting said means, resilient means biasing said pipe engaging means toward the pipe whereby said pipe engaging means is moved in opposite directions in response to vertical movements of the pipe, a pair of movable signal generating means, the motion of said generating means being related to the rotary movement of said table, and means including oppositely arranged one-way clutches operatively connected to said pipe engaging means and signal generating means control switches operated through said clutches for periodically and selectively rendering said signal generating means operative, and a stationary measuring means supplied with said signals for indicating the length of the pipe below said table.

6. In a drilling equipment, including a rotary table, an apparatus for measuring the depth of an elongated tubular pipe below said table, said apparatus including a pair of movable transmitters for producing distinctive signals, the motion of said transmitters being related to the rotation of said table, and pipe movement responsive means controlling said transmitters for selectively and periodically rendering said transmitters operative in response to the direction and extent of pipe movement, and a stationary measuring means supplied with the signals emitted by said transmitters for indicating the depth of the pipe.

7. In a drilling equipment, including a rotary table, an apparatus for measuring the depth of the elongated tubular pipe below said table, said apparatus including a pair of movable radio transmitters for producing distinctive signals, the motion of said transmitters being related to the rotation of said table, means including pipe movement responsive means and control signal producing means controlled thereby for selectively and periodically producing distinctive control signals in response to the direction and extent of pipe movement, and transmitter control means coupled to said control signal producing means for rendering said transmitters operative in response to said signals, and a stationary measuring means supplied with the signals emitted by said transmitter for indicating the depth of said pipe.

8. In a drilling equipment, including a rotary table, a system for measuring the depth of the elongated tubular pipe below said table, said system including a pair of movable radio transmitters for producing distinctive signals, the motion of said transmitters being related to the rotation of said table, means including pipe movement responsive means and control signal producing means controlled thereby for selectively and periodically producing distinctive control signals in response to the direction and extent of pipe movement, transmitter control means coupled to said control signal producing means for rendering said transmitters operative to transmit said distinctive signals, a pair of stationary receivers adapted to receive and to be operated in response to said distinctive signals, and measuring means conjointly controlled by said receivers.

9. In a drilling equipment, including a rotary table, a drill string depth measuring system including a pair of movable radio transmitters for producing distinctive signals, the motion of said transmitters being related to the rotation of said table, means including drill string movement responsive means and control signal producing means controlled thereby for selectively and periodically producing distinctive control signals in response to the direction and extent of drill string movement, transmitter control means coupled to said control signal producing means for rendering said transmitters operative to transmit said distinctive signals, a pair of stationary receivers responsive to said signals and operated in response thereto, operable means coupled to each receiver adapted to be operated each time its associated receiver is rendered operative, and means for algebraically adding the operations of said last mentioned means.

References Cited in the file of this patent

UNITED STATES PATENTS

| | | |
|---|---|---|
| 2,466,251 | Martin | Apr. 5, 1949 |
| 2,629,257 | Link | Feb. 24, 1953 |
| 2,655,633 | Minor et al. | Oct. 13, 1953 |
| 2,806,372 | Arps | Sept. 17, 1957 |
| 2,856,692 | Banning | Oct. 21, 1958 |